United States Patent

Leno et al.

[11] Patent Number: 6,161,821
[45] Date of Patent: Dec. 19, 2000

[54] HYDROPNEUMATIC SPRING STRUT

[75] Inventors: Valerij Leno, Hannover; Roland Altsinger, Burgdorf, both of Germany

[73] Assignee: ContiTech Luftfedersysteme GmbH, Hannover, Germany

[21] Appl. No.: 09/283,641

[22] Filed: Apr. 1, 1999

[30] Foreign Application Priority Data

Apr. 1, 1998 [DE] Germany ................ 198 14 549

[51] Int. Cl.[7] ........................................ F16F 9/04
[52] U.S. Cl. ................... 267/64.24; 267/64.21; 267/122; 188/322.19
[58] Field of Search ............... 267/64.21, 64.24, 267/64.26, 64.17, 64.19, 64.27, 122, 256; 188/322.19, 322.22

[56] References Cited

U.S. PATENT DOCUMENTS 4,325,541  4/1982  Korosladanyi et al. .

FOREIGN PATENT DOCUMENTS 3526156  1/1987  Germany .
3810011  12/1988  Germany .

*Primary Examiner*—Matthew C. Graham
*Assistant Examiner*—Pamela J. Lipka
*Attorney, Agent, or Firm*—Walter Ottesen

[57] ABSTRACT

A gas spring/shock absorber unit (2) or so-called gas spring strut includes a gas spring (4) having a gas spring resilient member (6), a gas spring piston (8) and a gas spring cover (10). The gas spring strut also includes a shock absorber (12), which is arranged coaxially within the gas spring (4) and has a damper cylinder (14), a damper piston (16) and a piston rod (18). The gas spring strut is so configured that wear of the mutually movable parts (16, 26) is substantially precluded. For this purpose, an impact disc (20) is disposed within the damper cylinder (14). The impact disc (20) partitions the volume of the damper (12) into two component spaces (22 and 24). Pass-through openings (28, 30) for the piston rod (18) of the shock absorber (12) are provided in the impact disc (20) and in the piston plate (26) of the gas spring piston (18), respectively. The pass-through openings (28, 30) provide respective connecting gaps (32, 34) between the gas and hydraulic liquid spaces (6a, 22 and 24). The hydropneumatic spring strut (2) can be used to suspend the chassis of automobiles and commercial vehicles such as buses, trucks and trailers.

6 Claims, 3 Drawing Sheets

HYDROPNEUMATIC SPRING STRUT

FIELD OF THE INVENTION

The invention relates to a hydropneumatic spring strut as it can be used for suspending the chassis of passenger cars and commercial vehicles including buses, trucks and trailers.

BACKGROUND OF THE INVENTION

Such an air spring/shock absorber unit, a so-called gas spring strut, is known in various forms, such as from German patent publications 3,526,156 and 3,810,011 as well as from U.S. Pat. No. 4,325,541. Such a gas spring strut is discussed by way of example with respect to FIG. 3.

A shock absorber having an impact disc is shown in FIG. 4 and is also indicative of the state of the art.

All conventional gas spring struts have separate pressure compartments which are charged with pressurized air or a hydraulic medium. In this context, a problem is present with respect to the sealing of the pass-throughs provided for the piston rods.

High manufacturing costs are associated with conventional pressure-loaded dampers in order to achieve the required tightness of the piston chamber movable relative to the piston rod, (for example, the required induction hardening at HCR 56±4, machining and polishing for a profile depth of $R_t \leq 0.2$ $\mu$m, at least 20 $\mu$m hard chrome coating in order to obtain a surface hardness of HCR 70±2).

Because of the wear of this seal, the service life of the damper or of the hydropneumatic spring strut is limited.

SUMMARY OF THE INVENTION

It is an object of the invention to overcome these disadvantages, that is, a hydropneumatic spring strut is provided which is practically free from wear of the movable parts. Also, the manufacturing costs are reduced because the machining processes are thereby unnecessary.

The hydropneumatic spring strut of the invention is for suspending the chassis of a trailer or a motor vehicle including an automobile, a truck and a bus. The hydropneumatic spring strut includes: a gas spring defining a longitudinal axis and including a gas spring cover, a gas spring piston having a piston plate and an annular resilient member connected between the gas spring cover and the gas spring piston; the gas spring cover, the gas spring piston and the annular resilient member conjointly defining a first space for a gas; a shock absorber defining a longitudinal axis and being arranged coaxially in the gas spring; the shock absorber including a damper cylinder defining a volume, a damper piston mounted for reciprocating movement in the damper cylinder and a piston rod connected to the damper piston; an impact disc mounted in the damper cylinder so as to partition the volume into second and third spaces; the impact disc and the piston plate having respective pass-through openings formed therein for accommodating the piston rod; and, the piston rod and the piston plate conjointly defining a first connecting gap between the first space and the second space and the piston rod and the impact disc conjointly defining a second connecting gap between the second and third spaces.

According to a feature of the invention, an intermediate wall is provided in the damper cylinder. It is then unnecessary to seal the upper plate of the gas spring piston relative to the piston rod. The disc or wall functions to take up the impact of the whirling medium.

The impact disc prevents a flow of the hydraulic medium into the gas spring region defined by the resilient member when the gas spring strut is inclined.

The additional center enclosed space I can be utilized with respect to its volume so that a level control or a level increase can take place when additional hydraulic medium flows in via a hydraulic connection.

It is conceivable to fix a closed-off gas volume in the region delimited by the resilient member. The gas spring strut is then influenced only by the change of the quantity of the hydraulic damping medium. For this purpose, the hydraulic pump of a power-assisted steering system can be utilized. The enclosed gas of the gas spring within the resilient member need only be checked during inspections. In this way, a gas spring compressor need not be provided. The disadvantage would be that the gas spring strut would have a greater structural height; that is, the use of the suggested hydropneumatic spring strut makes possible the level control of the vehicle by changing the pressure of the gas in the gas spring within the resilient member as well as by changing the quantity of hydraulic fluid in the damper (for example, by using a commercially available hydraulic pump of a power-assisted steering system or a hydraulic pump which is built in as an additional component.

The characteristics of the suspension can be adapted to driving conditions by a change of the additional volume of the gas in the shock absorber.

BRIEF DESCRIPTION OF THE DRAWINGS

The invention will now be described with reference to the drawings in which two embodiments are shown.

DESCRIPTION OF THE PREFERRED EMBODIMENTS OF THE INVENTION

Figure 1:
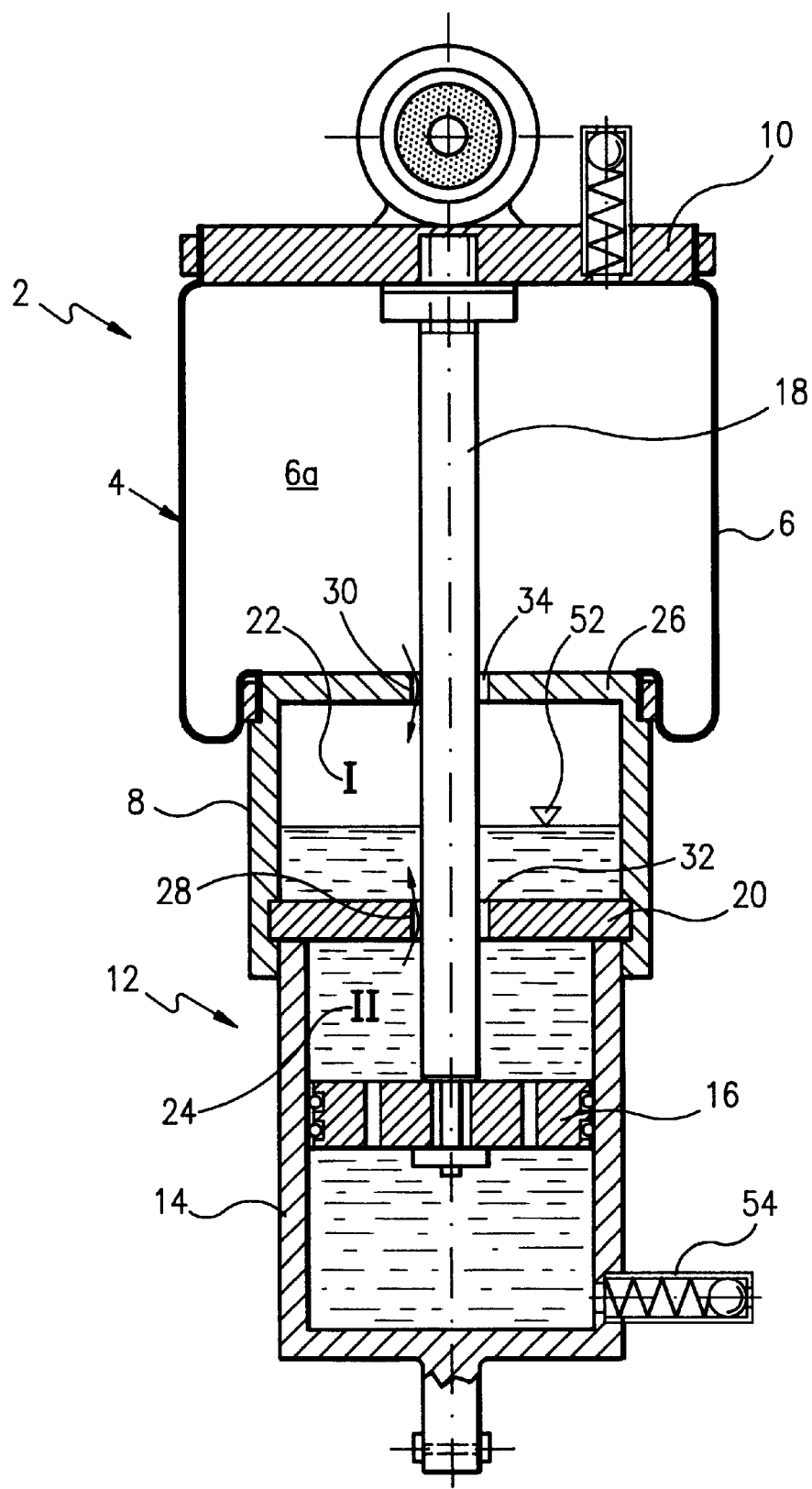
FIG. 1 is a longitudinal section view taken through a hydropneumatic spring strut having an integrated one-tube damper according to a first embodiment of the invention.
Figure 2:
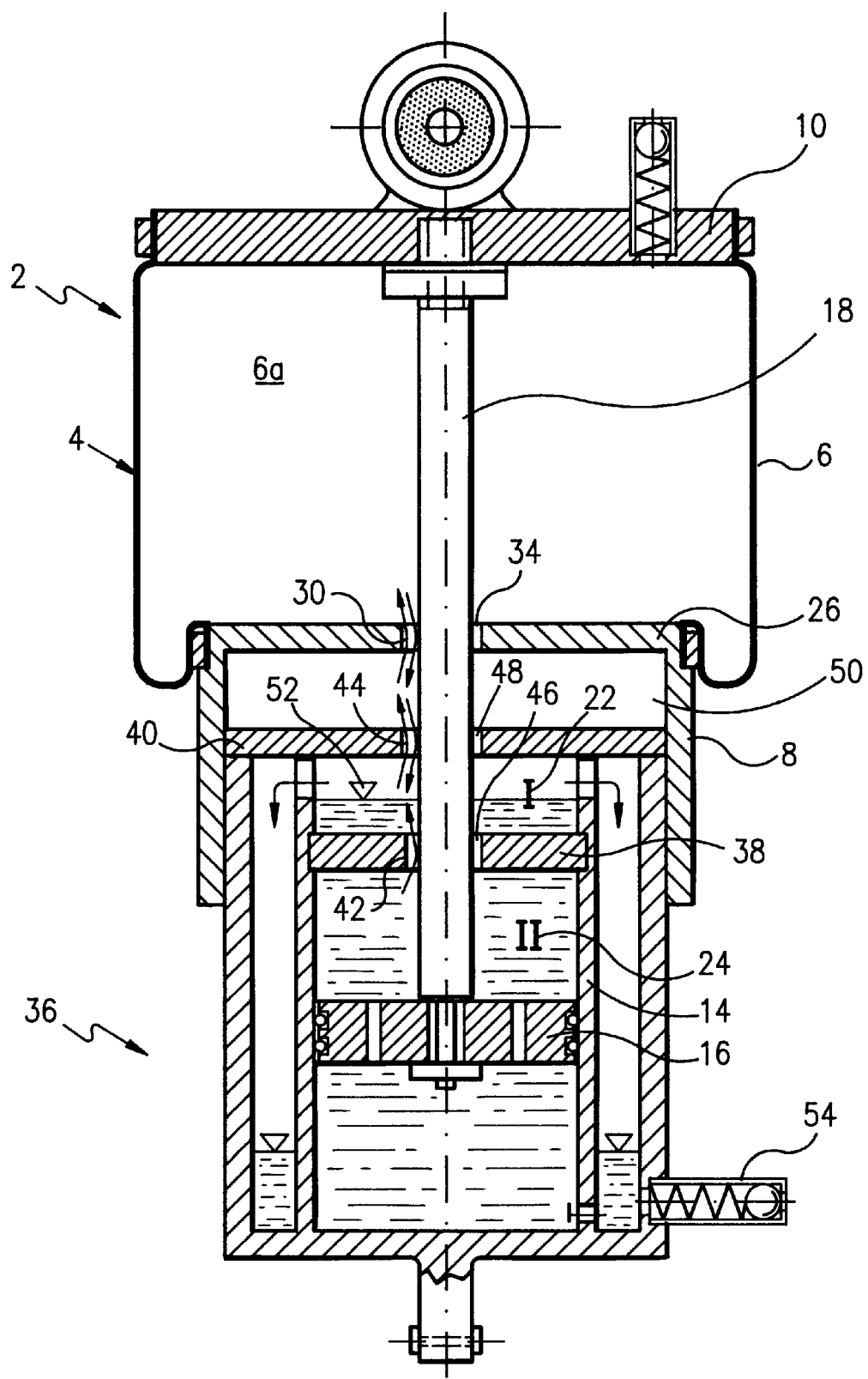
FIG. 2 is a longitudinal section view of a hydropneumatic spring strut according to a second embodiment of the invention and includes a two-tube damper.

FIGS. 1 and 2 each show a gas spring/shock absorber unit (hydropneumatic spring strut) 2 having an elastomeric gas spring resilient member 6. A fixed connection is provided via a piston rod 18 between the cover 10 of the gas spring 4 and the damper piston 16 of a hydraulic shock absorber 12 which is arranged coaxially within the hydropneumatic spring strut 2. The gas spring piston 8 is, in turn, fixedly attached to a cylinder 14 of the shock absorber 12. A pass-through opening 30 is provided for guiding the piston rod 18 in the upper plate 26 of the gas-spring piston 8. This upper plate 26 faces toward the resilient member 6. The pass-through opening 30 defines a connecting gap 34 which establishes a connection between the gas spring volume 6a of the gas spring resilient member 6 and the gas and liquid spaces (I) and (II) 22 and 24 of the shock absorber 12. The connecting gap 34 serves to equalize pressure between the gas spring volume 6a of the gas spring resilient member 6 and the damper chambers or spaces 22 and 24 and serves to return the hydraulic liquid into the shock absorber 12.

A high whirling of the damping medium is effected by the high damping pressures. Without the impact disc 20, a mixing of the gas and liquid at high frequencies could occur. If the hydropneumatic spring strut 2 is subjected to tension, then the damper piston 16 moves upwardly and an underpressure develops below the piston 16.

A foaming of the gas, which is located in the gas spring 4, with the oil charge of the work space 24 of the shock absorber 12 is prevented by an impact disc 20. This impact disc deflects as well as brakes the jets of oil coming from the damper piston 16 and shooting up the cylinder wall.

The liquid level 52 of the hydraulic liquid should always be above the impact disc 20.

In a manner similar to the upper plate 26 of the gas spring piston 8, the impact disc 20 also has a center opening 28 for guiding the piston rod 18. A connecting gap 32 is also provided here for the pass-through of the hydraulic liquid. Oscillating energy is converted into heat with the up and down movement of the piston 16 in the chamber or space 24 of the shock absorber.

The flow resistance of the hydraulic liquid is dependent upon the bores or valves. An adaptation of the damping effect to the driving characteristics is possible via a change of the bores. The shock absorber 12 has a hydraulic connection 54 in its lower region.

A hydropneumatic spring strut 2 results from the combination of the gas spring 4 and the hydraulic telescope shock absorber having the above-mentioned structural features. For the shock absorber, the principle of the hydraulic one-tube telescopic shock absorber 12 (FIG. 1) can be utilized as well as the principle of the hydraulic two-tube telescopic shock absorber 36 (FIG. 2).

In contrast to the hydropneumatic spring strut 2 having the one-tube shock absorber 12 as shown in FIG. 1, the two-tube shock absorber 36 shown in the spring strut 2 of FIG. 2 includes two impact discs 38 and 40. A further gas space 50 is formed between the upper impact disc 38 and the gas-spring piston 8.

The impact discs 38 and 40 have respective pass-through openings 42 and 44 for the piston rod 18. The pass-through openings 42 and 44 provide respective connecting gaps 46 and 48.

Figure 3:
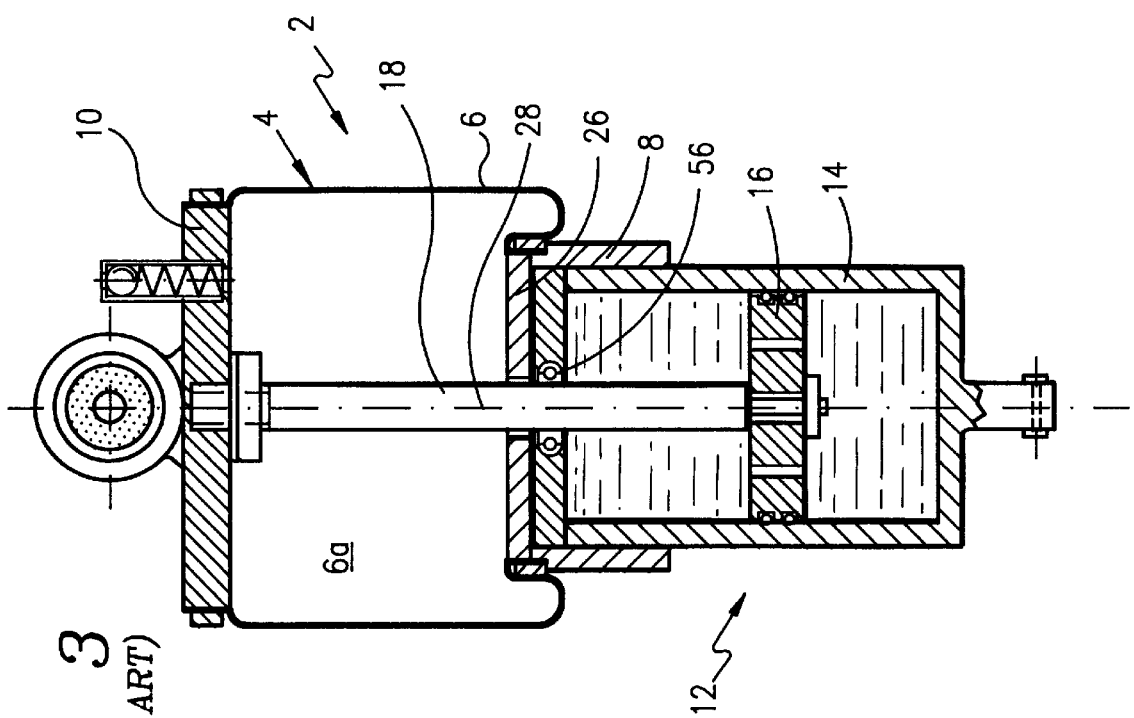
FIG. 3 is a schematic of a conventional hydropneumatic spring strut shown in longitudinal section; and, FIG. 4 is a schematic of a conventional pressure-charged one-tube damper without a partition piston and is also shown in longitudinal section.

A conventional construction of a hydropneumatic spring strut 2 comprising a gas spring 4 and a shock absorber 12 is shown in FIG. 3 and, as a rule, includes the following components: a gas spring resilient member 6 made of elastomer and a gas spring piston 8 which is movable relative to a cover 10. The shock absorber 12 is disposed coaxially within the gas spring 4 and has a piston 16 connected via a piston rod 18 to the cover 10 of the gas spring 4 while the cylinder 14 is fixedly connected to the gas spring piston 8. A seal 56 is disposed in the pass-through opening of the gas spring piston 8 for the piston rod 18 which is movable therethrough in order to prevent damper liquid from reaching the gas spring compartment 6a.

Figure 4:
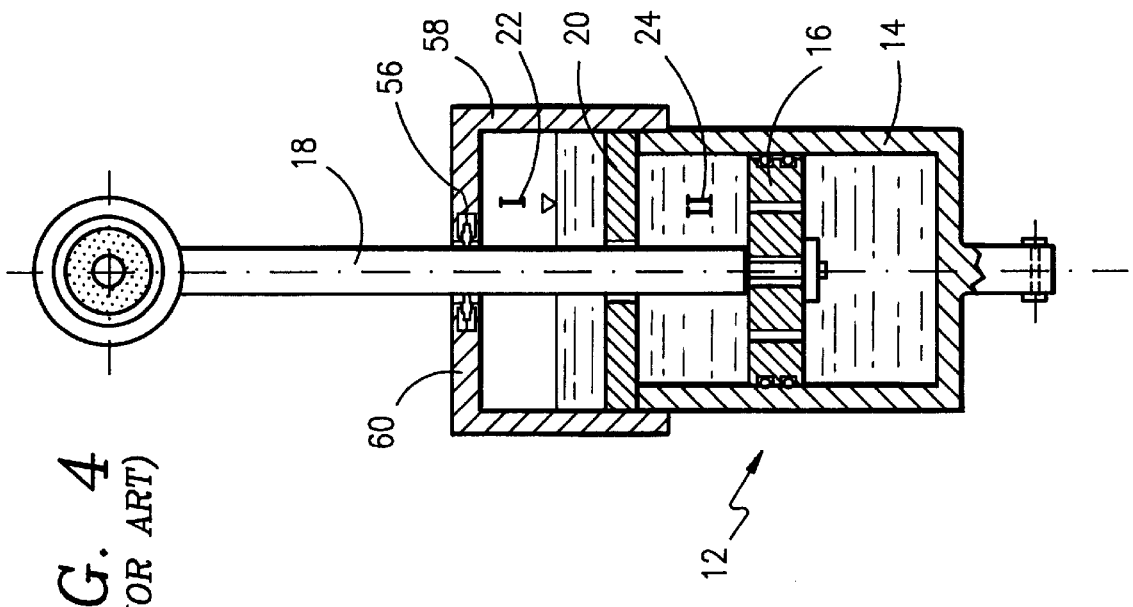

The conventional pressure-charged one-tube damper 12 without partition piston is shown in FIG. 4 and essentially includes a damper cylinder 14 and a piston 16 provided with a piston rod 18. The shock absorber 12 is expanded by an upper part 58 which is separated from the remainder of the damper cylinder 14 by an impact disc 20.

The damper volume comprises the gas space (I) 22 and the hydraulic liquid space (II) 24. The impact disc 20 as well as the upper plate 60 of the upper part 58 of the damper 12 include respective openings for the pass-through of the piston rod 18. The pass-through opening of the upper part 58 is provided with a seal 56.

It is understood that the foregoing description is that of the preferred embodiments of the invention and that various changes and modifications may be made thereto without departing from the spirit and scope of the invention as defined in the appended claims.

What is claimed is:

1. A hydropneumatic spring strut for suspending the chassis of a trailer or a motor vehicle including an automobile, a truck and a bus, the hydropneumatic spring strut comprising:

a gas spring defining a longitudinal axis and including a gas spring cover, a gas spring piston having a piston plate and an annular resilient member connected between said gas spring cover and said gas spring piston;

said gas spring cover, said gas spring piston and said annular resilient member conjointly defining a first space for a gas;

a shock absorber defining a longitudinal axis and being arranged coaxially in said gas spring;

said shock absorber including a damper cylinder defining a volume, a damper piston mounted for reciprocating movement in said damper cylinder and a piston rod connected to said damper piston;

an impact disc mounted in said damper cylinder so as to partition said volume into second and third spaces;

said impact disc and said piston plate having respective pass-through openings formed therein for accommodating said piston rod; and, said piston rod and said piston plate conjointly defining a first connecting gap between said first space and said second space and said piston rod and said impact disc conjointly defining a second connecting gap between said second and third spaces.

2. The hydropneumatic spring strut of claim 1, wherein said second space is delimited by said piston plate and said impact disc and is partially filled with liquid with the level of said liquid being disposed between said piston plate and said impact disc.

3. The hydropneumatic spring strut of claim 2, said shock absorber having a hydraulic connection.

4. The hydropneumatic spring strut of claim 1, said shock absorber including an annular wall coaxially arranged in said third space within said damper cylinder for accommodating said damper piston, said impact disc being a first impact disc and said shock absorber including a second impact disc arranged within said annular wall to partition the region within said annular wall into upper and lower spaces; and, said second impact disc likewise having a pass-through opening formed therein for accommodating said piston rod therein; and, said piston rod and said second impact disc conjointly defining a third connecting gap between said upper and lower spaces.

5. The hydropneumatic spring strut of claim 4, wherein said upper space is delimited by said first and second impact discs and is partially filled with liquid with the level of said liquid being disposed between said first and second impact discs.

6. The hydropneumatic spring strut of claim 5, said shock absorber having a hydraulic connection.

* * * * *